United States Patent [19]

Jones et al.

[11] 4,222,821

[45] Sep. 16, 1980

[54] CASING PAPER HAVING ALKALI RESISTANCE

[75] Inventors: Newlyn Jones, Berwick-Upon-Tweed, England; Alistair C. Stewart, Duns, Scotland; Colin Elston, Windsor, Conn.

[73] Assignee: C. H. Dexter Limited, United Kingdom

[21] Appl. No.: 947,116

[22] Filed: Sep. 29, 1978

Related U.S. Application Data

[63] Continuation-in-part of Ser. No. 749,353, Dec. 10, 1976, abandoned.

[51] Int. Cl.$^2$ .............................................. D21H 3/58
[52] U.S. Cl. ......................... 162/164 R; 162/164 EP; 162/177
[58] Field of Search ............. 162/164 R, 164 EP, 177; 426/105, 135; 138/118.1; 427/339

[56] References Cited

U.S. PATENT DOCUMENTS

| | | | |
|---|---|---|---|
| 3,833,022 | 9/1974 | Turbak et al. | 426/135 |
| 3,935,320 | 1/1976 | Chivetal | 426/135 |

FOREIGN PATENT DOCUMENTS 1091105 11/1967 United Kingdom ..................... 426/135

*Primary Examiner*—William F. Smith
*Attorney, Agent, or Firm*—Prutzman, Kalb, Chilton & Alix

[57] ABSTRACT

Fibrous casing paper is treated with viscose, a polyamide-epihalohydrin resin and cationic polyethylene imine resin to provide a synergistic improvement in the alkaline wet tensile strength while maintaining satisfactory viscose absorbency.

12 Claims, No Drawings

CASING PAPER HAVING ALKALI RESISTANCE

RELATED APPLICATION

This application is a continuation-in-part of our co-pending application Ser. No. 749,353 filed Dec. 10, 1976, now abandoned.

BACKGROUND AND SUMMARY OF THE INVENTION

The present invention relates to casing paper, which may be used for the production of packaging for meat products such as sausage.

Casing paper is commonly manufactured from paper webs of relatively strong, high-tenacity natural fibers, such as abaca, sisal or flax. The paper web is saturated with a dilute viscose solution, for example, a solution obtained by diluting a solution containing 7% by weight of cellulose (as cellulose xanthate) and 6% by weight of sodium hydroxide to a 1% cellulose content. The dilute viscose-saturated web is dried and the cellulose in the viscose is then regenerated by passing the web through an acidic regenerating bath containing, for example, a 1-8% aqueous sulphuric acid solution. The web is then washed free of acid and dried to produce a paper web impregnated with acid-regenerated cellulose. This casing paper is then generally formed into rolls ("master rolls").

Casings for the packaging of processed meats, e.g. sausage, may be manufactured from the casing paper by cutting it into strips which are then folded to form tubes. The tubes are saturated with an alkaline viscose solution, containing, for example, 7% by weight of cellulose and 6% by weight of sodium hydroxide. The cellulose in the viscose is then regenerated by means of an acidic regenerating bath containing, for example, dilute sulphuric acid and possibly such salts as sodium sulphate or ammonium sulphate. The tube is then passed through one or more baths in order to wash out the acid and the salts.

If desired, the tube may be passed through an aqueous bath which contains a plasticizer, e.g. glycerine, for the regenerated cellulose. The tube is dried by passing it through a heated chamber (the tube being in an inflated state) to give a cellulosic tubing which has embedded therein a paper web. This tubing may then be stuffed with a processed meat product under pressure. A process of this type is described in detail in U.S. Pat. No. 3,135,613 and its disclosure is incorporated herein by reference.

The purpose in treating the initial paper web with the dilute (1%) viscose solution, followed by regeneration, is to provide the web with strength and structural integrity so that it may withstand the treatment with the highly caustic viscose solution used in the formation of the casing tubes. The amount of regenerated cellulose in the casing paper prior to casing formation is, in fact, comparatively low, i.e. about 6% and less by weight and preferably about 2-3% by weight. Thus, the casing paper may have a typical basis weight (weight per unit area) of 20 grams/m$^2$, of which the regenerated cellulose accounts for 0.6 g/m$^2$, compared with the material of the casing tubes which may have a typical basis weight of 70-80 g/m$^2$, of which 50-60 g/m$^2$ may be accounted for by the cellulose. However, despite the initial treatment with dilute viscose, the treatment with the highly caustic, more concentrated viscose solution used in the formation of the casing tubes will inevitably entail a certain degree of softening and weakening of the web. This imposes a limit on the production speeds if difficulty in handling the webs and possible breakdowns in production are to be avoided. There is accordingly a need in the art for casing paper having an improved alkali resistance in order to permit higher production speeds in the manufacture of the casing tubes.

In U.S. Pat. No. 3,378,379, there is disclosed a tubular regenerated-cellulose casing for dry sausage, which casing is provided with a coating comprising a cationic thermosetting resin bonded to the inside wall thereof. The patent suggests that polyethylene imine may also be employed for this coating, although this material is not, in fact, a cationic thermosetting resin. The purpose of the inner coating is to improve the adhesion of the sausage casing to a dry sausage product despite any shrinkage which may occur when the dry sausage product is processed and dried in the casing over a prolonged period of time. It should be noted, however, that in the aforesaid process it is not the casing paper as such which is treated with the thermosetting resin, but the tubular casing material. In the embodiment illustrated in U.S. Pat. No. 3,378,379, the cationic thermosetting resin is applied to the inner surface of the casing tube after the application of glycerine and before the casing is dried, in an inflated state, in a heated chamber.

Another problem recognized in U.S. Pat. No. 3,378,379 is the variation in extensibility in the transverse direction exhibited by casing paper strips cut from different parts of the master roll. This can cause variation in the properties of the final casing tubes, which may therefore be unsatisfactory to the meat packager, for whom dimensional stability in the product is of commercial importance. To meet this problem it is suggested in the aforesaid U.S. Patent that a cationic thermosetting resin (e.g., a reaction product of epichlorohydrin and a polyamide, a modified melamineformaldehyde resin or a modified urea-formaldehyde resin) may be employed as the bonding agent in the casing paper, instead of the commonly employed acid-regenerated viscose. The cationic thermosetting resin is employed in an amount of at least 0.5% by weight based upon the dry weight of the impregnated fibrous web. The resin may be incorporated into the fibrous web by adding the resin to the fibrous slurry prior to forming the fibrous web. Alternatively, the formed fibrous web may be impregnated with the resin by passage through an aqueous solution of said resin. The said U.S. Patent also discloses the use of the thermosetting resin in combination with viscose which is not regenerated with an acid; however, in the latter case, the viscose may be auto-regenerated by storing the web for a sufficient period.

In United Kingdom Pat. No. 1,091,105, there is described a process in which casing paper is produced by incorporating into a paper web an alkaline-curing resin such as polyethylene imine or a polymeric reaction product of epichlorohydrin and a polyamide. The use of the alkaline-curing resin in place of the customary treatment with dilute viscose is said to result in a casing paper which has more uniform characteristics across its width and which results in a casing having improved burst strengths. However, it has now been found that the casing paper so produced has an alkali resistance which is insufficient to permit sufficiently high production speeds for the commercial manufacture of the casing tubes.

It is an object of the present invention to provide a process for the production of casing paper having a good alkaline wet strength and from which casing tubes may be produced using high-speed commercial processes.

Other objects will be in part obvious and in part pointed out more in detail hereinafter.

Accordingly, the present invention provides a process for the production of casing paper of improved alkaline wet tensile strength suited for subsequent converstion into casing, which process comprises forming a fibrous paper web, treating the fibrous paper web with a dilute viscose solution and subsequently regenerating the cellulose in the viscose by means of an acid and treating the fibres of the paper web with a cationic polyethylene imine resin. Preferably, the resin treatment is carried out prior to, or simultaneously with, the treatment with the said dilute viscose solution.

The present invention also provides casing paper when prepared by the aforesaid process, as well as casing material (casing tubes or skins) prepared from the said casing paper by a process comprising the application of a caustic viscose solution and subsequent acid regeneration.

A better understanding of this invention will be obtained from the following description of the process including the several steps and the relation of one or more of such steps with respect to each of the others and the article of manufacture possessing the features, characteristics, compositions, properties and relation of elements described and exemplified herein.

DESCRIPTION OF A PREFERRED EMBODIMENT

In accordance with the present invention, it has been found that there is a synergistic effect between the polyalkylene imine and the viscose, which can result in a marked improvement in the alkaline wet strength of casing paper produced according to the present invention, whilst the viscose absorbency of the casing paper remains satisfactory. It has been found that the imine resin, when used in the absence of any other binding agent, provides virtually no increase in the wet strength of the paper web. Moreover, the attainment of such an improved alkaline wet strength is particularly surprising since the imine can be decomposed, under certain conditions, by acids.

The polyalkylene imine is a water soluble, cationic, homopolymeric, nonthermosetting resin having a molecular weight of greater than 10,000. It is known in the paper-making art as a retention aid to prevent fibers passing through the paper-making wire. It has also been suggested for use in certain specialty papers where it may slightly increase the wet strength. The preferred polyalkylene imine resin is polyethylene imine (PEI) which may be synthesized by acid-catalyzed polymerization of the monomer ethyleneimine. The resin is a highly branched polymer that can vary in molecular weight from only about a few thousand up to about 100,000 or more. The preferred PEI has been found effective at molecular weights above 10,000 and preferably between about 30,000 and 60,000. PEI is a positively charged cationic resin with its charge density increasing as its normally alkaline solution is acidified.

Generally, the amount of PEI added to the fibrous web will be less than three percent by weight with the typical range being 0.1 to 2% and preferably 0.2 to 1%, by weight of the fibrous web, on a dry weight basis.

The second additive, dilute viscose, is added to the fibrous material in amounts which are customary in the art for the production of casing papers containing acid-regenerated viscose. Thus the viscose treatment will add to the fibrous web up to about 6–7% by weight of regenerated cellulose. However, typically the amount added will be in the range of about 0.2 to 4.0% by weight with a preferred added cellulose content being about 2–3% by weight.

The PEI may be added to the fibres during the paper-web-making process or may be applied to the fibrous web as made. Conveniently, however, the PEI may be included in the dilute viscose solution itself.

In a particularly preferred embodiment of the present invention, the fibres of the paper web are also treated with a third material; namely, a polyamide-epichlorohydrin resin. Preferably, the fibrous web is treated with both the polyethylene imine and the polyamide-epichlorohydrin resin prior to or simultaneously with the treatment with the viscose solution. It has been found that the alkali resistance of casing paper prepared by this method can be significantly higher than would be expected from results obtained by treatment with either of the treating agents alone.

Normally the amount of the polyamide-epichlorohydrin resin will be 0.1 to 4%, and preferably 0.25 to 2%, by weight of the fibrous web, on a dry weight basis.

The fibrous webs used in making casing paper are conventionally composed of natural vegetable fibres of pure cellulose and are preferably composed of long lightweight nonhydrated fibres of the Musa type, particularly hemp fibres of the Manila or abaca hemp variety. Webs made from this material are generally soft porous papers of uniform texture and thickness and have for some time found wide acceptance as the primary fibre component of the fibrous base webs used in casing manufacture.

Prior to its impregnation with a caustic viscose solution or the like in order to form the final casing material, the casing paper may be treated in order to improve its absorbency yet further. One preferred method is to subject at least one side of the web to a corona discharge treatment at an energy density of at least 0.5 Watt-min/ft$^2$ of web surface. The usual level will exceed 1.5 Watt-min/ft$^2$ and is preferably 5 to 40 Watt-min/ft$^2$.

The following examples are given in order that the effectiveness of the present invention may be more fully understood. These examples are set forth for the purpose of illustration only and are not intended in any way to limit the practice of the invention. Unless otherwise specified, all parts are given by weight.

EXAMPLE I

Handsheets were made in the laboratory using an abaca stock. A 0.1% solution of Polymin P (the trade name of a polyethylene imine having a molecular weight believed to be about 30,000 and marketed by BASF, Germany) was added to the sheet mold in an amount sufficient to provide about 1% by weight polyethylene imine in the resultant handsheets, on a dry weight basis. Some of the handsheets were used as controls with no further treatment. The remainder of the handsheets were saturated with a dilute viscose solution and subjected to the acid-regeneration process. These sheets, after drying, contained approximately 2% cellulose regenerated from the viscose solution. All of the sheets were tested for their wet tensile strength and alkaline wet tensile strength on both Instron and Scott tensile testers. For testing the alkaline wet tensile strength, the sheets were saturated with a 6% solution of sodium hydroxide prior to testing. The results of the testing are shown in Table I below.

EXAMPLE 2

Handsheets were made in the laboratory using an abaca stock. The handsheets so produced were then impregnated simultaneously with polyethylene imine (Polymin P) and viscose from a mixed solution using a laboratory sizepress. The additives were present in the saturating bath of the sizepress in the ratio of 10 parts by weight dry Polymin P to 90 parts dry viscose. The sheets were treated under conditions such that 0.2% by weight polyethylene imine and 1.8% cellulose regenerated from the viscose remained in the sheet upon final drying after regeneration and washing. The treated handsheets were then tested for their wet tensile strength and alkaline wet tensile strength, as described in Example 1.

For comparison purposes, handsheets were made that were treated with either viscose only or polyethylene imine only at the indicated treatment levels, and these were tested as described above.

The results are shown in Table 1, below, where the wet tensile and alkaline wet tensile strengths are averages of a number of test results. In the cases of the viscose only and of Example 1, results are presented for two different sheet weights.

Table 1

| TREATMENT | % PEI in Sheet | % Cellulose from Viscose in Sheet | Sheet Basic Weight (gsm) | Wet Tensile Strength (gms/ 25 mm) | Alkaline Wet Tensile Strength (g/25 mm) |
| --- | --- | --- | --- | --- | --- |
| Imine only | 1.0 | 0 | 24.4 | 60 | 10 |
| Viscose only | 0 | 2.0 | 26.4 | 920 | 15 |
| Viscose only | 0 | 2.0 | 27.3 | 950 | 60 |
| Example 1 | 1.0 | 2.0 | 25.0 | 800 | 210 |
| Example 1 | 1.0 | 2.0 | 27.5 | 1070 | 240 |
| Example 2 | 0.2 | 1.8 | 24.6 | 990 | 310 |

EXAMPLE 3

Non-viscose treated casing paper base was manufactured on a small-scale (24 inches wide) paper machine. The base stock was prepared by defibering a known weight of abaca pulp at a consistency of approximately 4%, and adding to the base stock various quantities of additive selected from polyethylene imine (Polymin P), Kymene 557 (the trade name of a water-soluble epichlorohydrin-polyamide resin marketed by Hercules Powder Company) and mixtures thereof.

The pre-treated base paper was then converted to casing paper on a commercial continuous-process unit, the base paper being first saturated with a dilute viscose solution in a sizepress. After partial drying of the base paper sheets, the viscose was regenerated in an acid bath, the sheets being subsequently washed to remove any excess chemicals, dried and wound up. The amount of viscose applied to the sheet in the process was approximately 2% by weight of the original sheet.

The finished casing papers were then tested for conventional wet tensile strength, this being measured on strips of the paper 25 mm wide which were saturated with water. The alkali resistance of the casing papers was measured by recording the tensile strength of wet strips, 15 mm wide, after soaking them for 20 minutes in a 6% solution of sodium hydroxide (the results being designated as the alkaline wet tensile strength). The absorbency of the sheets was also measured as the time taken for water to climb 1 inch up a vertical strip of the casing paper. A high absorbency value (long absorbency time) will indicate that an undesirable sizing effect had taken place, which would interfere with the resaturating of the casing paper with viscose as effected during the customary manufacture of casing tubes or skins.

The results obtained are shown in Table 2 below. The tensile strengths are quoted both as measured (for an average of seven tests for each sample) and also as corrected to a constant basis weight in order to allow direct comparison of the effects to be observed. This, of course, depends upon the assumption that strength is directly proportional to weight, an assumption which may not be prefectly correct, but which is sufficiently valid for the present purposes.

Also quoted is the ratio of the wet strength initially retained after the 20 minutes' soak in alkali. This helps in assessing the true alkali resistance of the sheets, but should be considered in conjunction with the actual strength figures.

From the results given in Table 2, the following conclusions can be drawn.

The use of polyamide-epichlorohydrin resin with regenerated viscose provides an increase in wet strength at an addition level of 1%-2% by weight, but appears to have no significant effect on the alkaline wet strength.

The alkaline wet strength is increased with increasing levels of polyethylene imine when this is employed alone in the base sheet.

A combination of a polyamide-epichlorohydrin resin and polyethylene imine causes an increase in wet tensile strength similar to that obtained by pretreating the base with polyamide-epichlorohydrin resin alone, but brings about a very marked improvement in alkaline wet tensile strength at all levels used. However, the addition of 0.5% to 1% polyamide-epichlorohydrin resin in combination with 0.5% of polyethylene imine (by weight of the base web, on a dry weight basis) appears to be a particularly efficient amount, based on considerations of both performance and addition levels.

No detrimental effect on absorbency appears to be caused by any of the additions made.

Table 2

| Pre-Treatment of Base (expressed as dry wt. of additive on dry wt. of fibre, as percentage). (All webs subsequently viscose treated) | Basis Wt. (gsm.) | Wet Tensile Strength (gms/25mm) | Wet Tensile Strength converted to 21 gsm B.W. | Alkaline Wet Tensile Strength (gms 5mm) | Alkaline Wet Tensile Strength converted to 21 gsm B.W. | % Alk. W.T. / W.T. | Absorbency (secs) |
|---|---|---|---|---|---|---|---|
| No Pre-treatment | 23.40 | 1391 | 1248 | 317 | 284 | 22.8 | 17 |
|  | 19.38 | 1255 | 1360 | 228 | 247 | 18.1 | 11 |
|  | 19.13 | 1086 | 1192 | 203 | 220 | 18.7 | 10 |
|  | 22.0 | 1219 | 1164 | 299 | 285  256 | 24.5 | 12 |
|  | 22.90 | 1294 | 1187 | 342 | 314  Ave. | 26.4 | 12 |
|  | 22.03 | 1376 | 1312 | 215 | 205 | 15.6 | 10 |
|  | 22.46 | 1361 | 1273 | 254 | 237 | 18.7 | 12 |
| Polyamide-epichlorohydrin 1.0% | 21.00 | 1484 | 1484 | 242 | 242  248 | 16.3 | 20 |
| (Kymene 557) 2.0% | 22.22 | 1646 | 1556 | 269 | 254  Ave. | 16.3 | 11 |
| Polyethyleneimine 0.25% | 20.05 | 1238 | 1296 | 250 | 262 | 20.2 | 21 |
| (Polymin P) 0.5% | 23.67 | 1454 | 1290 | 346 | 307 | 23.8 | 14 |
| Kymene 557/0.25/0.25% | 21.87 | 1359 | 1367 | 346 | 332 | 25.5 | 13 |
| Polymin P 0.5/0.5% | 21.11 | 1489 | 1481 | 392 | 289 | 26.3 | 9 |
| 1.0/0.5% | 22.27 | 1496 | 1411 | 433 | 408 | 28.9 | 8 |
| 2.0/0.5% | 26.74 | 1948 | 1530 | 529 | 415 | 27.2 | 7 |

EXAMPLE 4

Handsheets were made in the laboratory using an abaca stock. A 0.1% solution of a polyethylene imine (PEI 600, manufactured by Dow Chemical Co.) having a molecular weight of 60,000 was added to the sheet mold in amounts sufficient to provide between 0.1% and 2.0% polyethyleneimine in the resultant handsheets on a dry weight basis. Also added to the sheet mold was a 0.1% solution of polyamide-epichlorohydrin resin (Kymene 557 H) in amounts sufficient to provide between 0.1 and 4.0% polyamide-epichlorohydrin in the resultant handsheets on a dry weight basis.

The handsheets were then saturated with a dilute (1%) viscose solution, subjected to an acid regeneration process, and tested for their wet strength and alkaline wet-strength as previously described. The saturation conditions were controlled to yield approximately 3% regenerated cellulose in the sheet from the viscose. The results from this series of tests are presented in Table 3.

As can be seen, a significant improvement is achieved in alkaline wet tensile relative to the additive-free control (Sheet A) when equivalent 0.1% addition levels of Kymene and PEI 600 are incorporated (Sheet B). However, the near-maximum levels of alkaline tensile strengths are not reached until equivalent 0.2% addition levels or higher of Kymene and PEI 600 are incorporated in the sheet.

Table 3

| Sheet | % Kymene in sheet | % PEI in sheet | Wet Tensile Strength (Converted to 21gsm) g/25mm | Alkaline Wet Tensile Strength (converted to 21 gsm) g/25mm | Ratio of Wet Tensile-Wet Tensile Strength |
|---|---|---|---|---|---|
| A | 0 | 0 | 730 | 130 | 17.8 |
| B | 0.1 | 0.1 | 770 | 185 | 24.0 |
| C | 0.2 | 0.2 | 661 | 281 | 42.5 |
| D | 1.0 | 1.0 | 852 | 397 | 46.6 |
| E | 2.0 | 2.0 | 892 | 331 | 37.1 |
| F | 0.5 | 0.5 | 1022 | 400 | 39.1 |
| G | 1.0 | 0.5 | 930 | 447 | 48.0 |
| H | 2.0 | 0.5 | 970 | 443 | 42.6 |
| I | 4.0 | 0.5 | 1030 | 361 | 35.0 |
| J | 0.5 | 1.0 | 950 | 430 | 42.5 |
| K | 0.5 | 2.0 | 904 | 467 | 51.7 |

By comparing the results for sheets F, G, H and I, one can note the effect of increasing the level of Kymene 557 H while retaining a constant level of PEI. At addition levels of 0.5% and 1.0% of Kymene, the alkaline wet strength continues to increase, but at the 2% and 4% addition levels it begins to decrease. Although still showing a distinct advantage over the untreated control, it is considered that the 4.0% addition level of Kymene 557 H (as demonstrated in Sheet N) represents the practical upper limit of addition of that material.

By comparing the results for samples F, J and K, one may note the effect of retaining the Kymene addition level constant at 0.5%, and increasing the PEI 600 level from 0.5 to 2.0%. Unlike the Kymene, increasing addition levels of PEI result in continually increasing alkaline wet tensiles. However, increased addition levels of PEI into a cellulose furnish results in the paper becoming more and more yellowish-colored, and it is considered that papers containing more than 2.0% PEI could be unacceptably colored.

As will be apparent to persons skilled in the art, various modifications, variations, and adaptations can be made from the foregoing specific disclosure without departing from the teachings of the present invention.

We claim:

1. A process for the production of casing base paper of improved alkaline wet tensile strength suited for the subsequent conversion into casing for meat products and the like comprising the steps of forming a fibrous paper web, treating the fibers of the paper web with a water soluble polyalkylene imine resin in an amount of about 3.0% by weight and less based on the weight of the fibrous web, treating the fibrous web paper with a diluted viscose solution having a cellulose concentration of about 2% by weight and less and subsequently regenerating the cellulose in the treating viscose by means of an acid, treating said fibers with a polyamide-epihalohydrin resin in an amount of 0.1 to 4% by weight of the fibrous web on a dry weight basis, whereby the casing base paper resulting from these treatments has an alkaline wet tensile strength substantially greater than the sum of the alkaline wet tensile strengths of (1) paper of comparable fiber content treated with only said polyalkylene imine (2) paper of comparable fiber content treated with only said diluted viscose solution and the cellulose regenerated and (3) paper of comparable fiber content treated with said polyamide epihalohydrin resin.

2. The process of claim 1 wherein the treatment with polyalkylene imine is carried out prior to the treatment with the dilute viscose solution.

3. The process of claim 1 wherein the treatment with polyalkylene imine is carried out simultaneously with the treatment with the dilute viscose solution.

4. The process of claim 3 wherein the polyalkylene imine is included in the dilute viscose solution applied to the fibrous web.

5. The process of claim 1 wherein the polyalkylene imine is incorporated into the fibrous web in an amount of 0.1 to 2.0% by weight.

6. A process according to claim 1 wherein the polyalkylene imine is polyethylene imine and is incorporated into the fibrous web in an amount of 0.2 to 1% by weight.

7. A process according to claim 1 wherein the polyalkylene imine and the epihalohydrin resin are incorporated into the fibrous web during the web-forming process.

8. A process according to claim 1 wherein the polyalkylene imine and the epihalohydrin resin are incorporated into the fibrous web simultaneously with the dilute viscose solution.

9. A process according to claim 1 wherein the polyamide-epihalohydrin resin is incorporated into the fibrous web in an amount of 0.25 to 2% by weight of the fibrous web, on a dry weight basis.

10. Casing base paper of improved alkaline wet tensile strength suited for the subsequent conversion into casing for meat products and the like comprising a fibrous paper web containing about 6% by weight and less of a regenerated cellulose impregnant, 0.1% to 4% by weight of a polyamide-epihalohydrin resin and having incorporated therein 3% by weight and less of a polyalkylene imine resin, said casing base paper having an alkaline wet tensile strength substantially greater than the sum of the alkaline wet tensile strengths of (1) paper of comparable fiber content treated with only said polyalkylene imine resin, (2) paper of comparable fiber content treated with only said regenerated cellulose impregnant and (3) paper of comparable fiber content treated with only said polyamide-epihalohydrin resin.

11. The casing paper of claim 10 wherein the polyalkylene imine resin is polyethylene imine.

12. The casing paper of claim 10 wherein the epihalohydrin resin is a polyamide-epichlorohydrin resin.

* * * * *